United States Patent
Diamant et al.

(10) Patent No.: US 10,218,576 B1
(45) Date of Patent: Feb. 26, 2019

(54) CONTROLLED BANDWIDTH EXPANSION IN COMPRESSED DISAGGREGATED STORAGE SYSTEMS

(71) Applicant: Amazon Technologies, Inc., Seattle, WA (US)

(72) Inventors: Ron Diamant, Albany, CA (US); Leah Shalev, Zichron Yaakov (IL); Nafea Bshara, San Jose, CA (US); Erez Izenberg, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/110,270

(22) Filed: Aug. 23, 2018

Related U.S. Application Data

(63) Continuation of application No. 14/982,505, filed on Dec. 29, 2015, now Pat. No. 10,063,422.

(51) Int. Cl.
*G06F 15/16* (2006.01)
*H04L 12/24* (2006.01)
*H04L 29/06* (2006.01)
*G06F 3/06* (2006.01)

(52) U.S. Cl.
CPC ........ *H04L 41/0896* (2013.01); *G06F 3/0604* (2013.01); *G06F 3/067* (2013.01); *G06F 3/0638* (2013.01); *H04L 67/42* (2013.01)

(58) Field of Classification Search
CPC ... H04L 41/0896; H04L 67/42; G06F 3/0604; G06F 3/0638; G06F 3/067
USPC ........................................................ 709/223
See application file for complete search history.

(56) References Cited

U.S. PATENT DOCUMENTS

| | | | |
|---|---|---|---|
| 7,145,898 B1* | 12/2006 | Elliott | H04L 12/66 370/352 |
| 8,189,407 B2* | 5/2012 | Strasser | G06F 3/0613 365/189.09 |
| 8,190,000 B2 | 5/2012 | Morimoto et al. | |
| 8,422,850 B2 | 4/2013 | Nakane | |
| 8,468,315 B2* | 6/2013 | Browne | G06F 11/2066 707/610 |
| 8,548,962 B2* | 10/2013 | Tapply | H03M 7/40 707/693 |
| 8,706,914 B2* | 4/2014 | Duchesneau | G06F 9/5072 709/203 |
| 8,717,961 B2* | 5/2014 | Ryu | H04H 20/72 370/312 |
| 8,737,297 B2 | 5/2014 | Reznik et al. | |

(Continued)

*Primary Examiner* — Melvin H Pollack
(74) *Attorney, Agent, or Firm* — Klarquist Sparkman, LLP

(57) ABSTRACT

Technologies for performing controlled bandwidth expansion are described. For example, a storage server can receive a request from a client to read compressed data. The storage server can obtain individual storage units of the compressed data. The storage server can also obtain a compressed size and an uncompressed size for each of the storage units. The storage server can generate network packet content comprising the storage units and associated padding such that the size of the padding for a given storage is based on the uncompressed and compressed sizes of the given storage unit. The storage server can send the network packet content to the client in one or more network packets. The client can receive the network packets, discard the padding, and decompress the compressed data from the storage units.

20 Claims, 8 Drawing Sheets

(56) References Cited

U.S. PATENT DOCUMENTS

| | | | |
|---|---|---|---|
| 8,750,315 B2* | 6/2014 | Dandekar | H04L 65/602 |
| | | | 370/395.61 |
| 8,842,967 B2* | 9/2014 | McDermott | G11B 27/034 |
| | | | 386/239 |
| 8,854,882 B2 | 10/2014 | Strasser et al. | |
| 9,432,338 B2 | 8/2016 | Roskind | |
| 9,507,843 B1 | 11/2016 | Madhavarapu et al. | |
| 9,560,093 B2* | 1/2017 | Holt | H04L 67/06 |
| 9,591,099 B1* | 3/2017 | Pittman | H04L 67/42 |
| 9,667,751 B2* | 5/2017 | Fallon | H04L 12/1895 |
| 9,690,513 B2 | 6/2017 | Resch | |
| 9,703,796 B2 | 7/2017 | Kumar et al. | |
| 9,716,900 B2* | 7/2017 | Ramasubramonian | H04N 19/70 |
| 9,743,142 B2 | 8/2017 | Cholas et al. | |
| 9,772,904 B2 | 9/2017 | Alnafoosi et al. | |
| 9,774,679 B2 | 9/2017 | Storm et al. | |
| 9,781,211 B2 | 10/2017 | Langas et al. | |
| 9,813,310 B1* | 11/2017 | Sieracki | H04L 43/04 |
| 9,838,513 B2* | 12/2017 | Doan | H04L 69/22 |
| 9,911,487 B2* | 3/2018 | Nieuwejaar | G06F 3/0611 |
| 9,917,874 B2* | 3/2018 | Luby | H04N 21/23106 |
| 9,921,756 B2* | 3/2018 | Nieuwejaar | G06F 3/0611 |
| 10,073,630 B2* | 9/2018 | Yang | G06F 3/0611 |
| 2008/0304810 A1* | 12/2008 | Rijckaert | H04N 5/783 |
| | | | 386/344 |
| 2011/0096828 A1* | 4/2011 | Chen | H04N 21/23106 |
| | | | 375/240.02 |
| 2011/0317547 A1* | 12/2011 | Baudoin | H04L 65/607 |
| | | | 370/216 |
| 2014/0317350 A1 | 10/2014 | Langas et al. | |
| 2014/0325023 A1 | 10/2014 | Caulfield et al. | |
| 2016/0293274 A1 | 10/2016 | Schuh et al. | |
| 2016/0350171 A1 | 12/2016 | Resch et al. | |
| 2016/0350329 A1 | 12/2016 | Resch et al. | |
| 2017/0155922 A1 | 6/2017 | Yoo et al. | |
| 2017/0186466 A1 | 6/2017 | Russel | |
| 2017/0243485 A1* | 8/2017 | Rubin | H04W 72/005 |
| 2017/0272691 A1 | 9/2017 | Song et al. | |
| 2018/0007108 A1* | 1/2018 | Karkkainen | H04L 69/22 |
| 2018/0138921 A1* | 5/2018 | Arelakis | H03M 7/6088 |

* cited by examiner

CONTROLLED BANDWIDTH EXPANSION IN COMPRESSED DISAGGREGATED STORAGE SYSTEMS

CROSS REFERENCE TO RELATED APPLICATIONS

This is a Continuation of U.S. patent application Ser. No. 14/982,505, filed Dec. 29, 2015, which is hereby incorporated by reference.

BACKGROUND

Compression is widely used in storage systems to reduce the amount of data that is written to physical storage devices in order to improve the storage bandwidth and reduce the cost of the storage devices. With the availability of fast network interconnect technologies in data center environments, disaggregation of storage facilities from compute servers considerably reduces the total cost of investment (e.g., by improving the efficiency of storage utilization and adding resiliency to the storage facilities). However, disaggregation of storage facilities typically means that data compression and decompression operations are performed by the compute servers.

DETAILED DESCRIPTION

Overview

Figure 1:
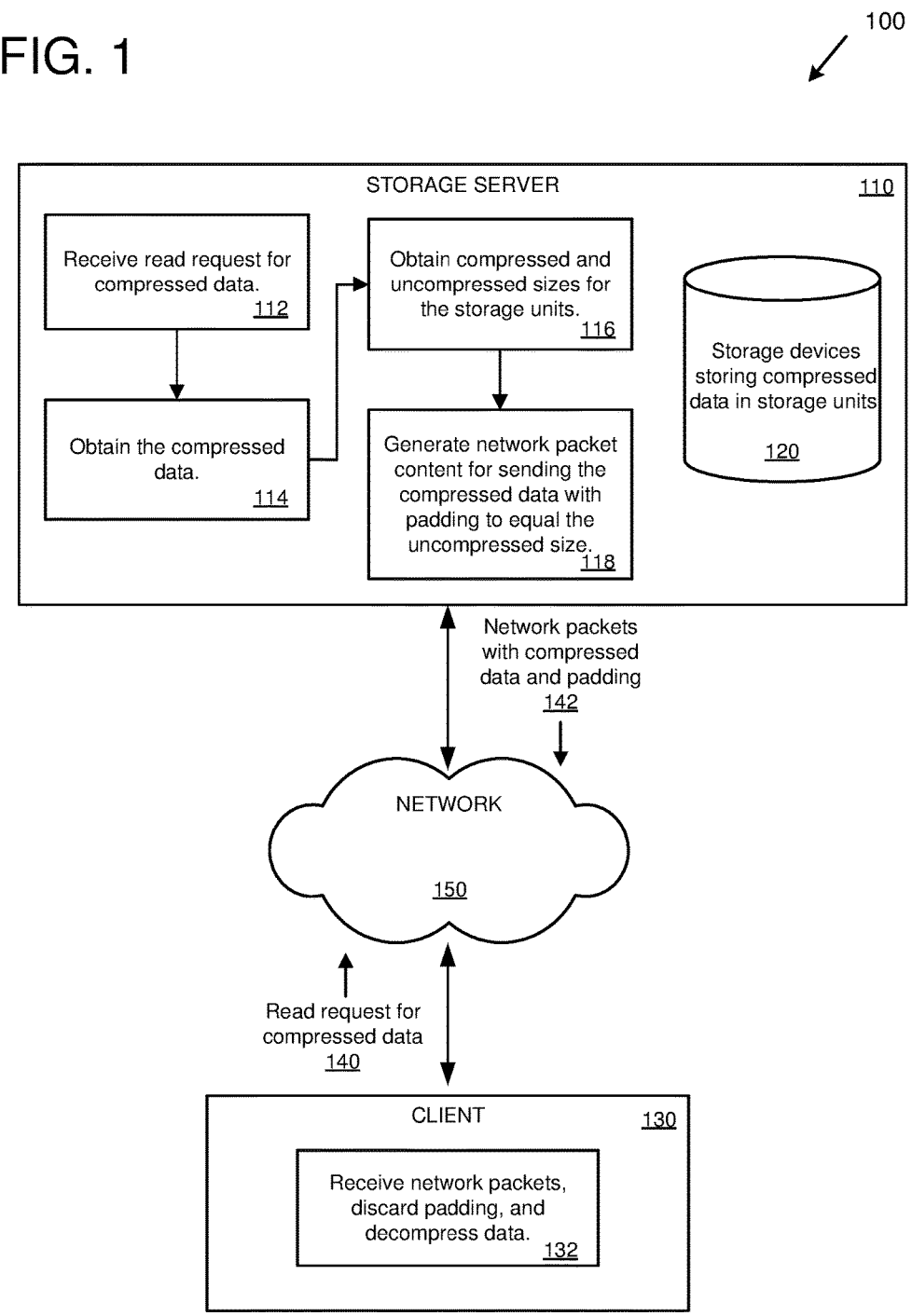
FIG. 1 is a diagram of an example environment supporting controlled bandwidth expansion.

The following description is directed to technologies for performing controlled bandwidth expansion. For example, a storage server can receive a request from a client to read compressed data. The storage server can obtain individual storage units (e.g., block storage units or object storage units) of the compressed data (e.g., from a local or remote storage device). The storage server can also obtain a compressed size and an uncompressed size for each of the storage units. The storage server can generate network packet content comprising the storage units and associated padding such that the size of the padding for a given storage unit equals the uncompressed size of the given storage unit minus the compressed size of the given storage unit. The storage server can send the network packet content to the client in one or more network packets.

Compression is widely used in storage systems to reduce the amount of data that is written to physical storage devices. Furthermore, with the availability of fast network interconnect technologies (e.g., 10 Gbps, 25 Gbps, etc.), storage systems can be disaggregated from the compute servers that utilize such storage systems. For example, in a data center environment, one or more storage systems can separately store data for one or more clients (e.g., compute servers). Disaggregation of storage can provide a number of advantages, including improved efficiency and resiliency. Compression is typically used when storing data in a disaggregated storage system. Furthermore, compression is typically done at the client for a number of reasons, including scalability (e.g., a single storage system may support many clients and therefore the storage system may not be able to handle compression of large volumes of data server-side) and encryption. Regarding encryption, if a client will be encrypting the data, then compression would also need to be performed at the client before the data is encrypted. The reason is that it is not practical to perform compression at the storage server is because encrypted data cannot be effectively compressed.

One issue with the use of disaggregated storage systems is the problem of uncontrolled bandwidth expansion. Uncontrolled bandwidth expansion is caused by a client retrieving compressed data from a storage system and decompressing the retrieved data which can result in various problems at the client (e.g., overloading of memory busses, etc.). For example, a client can read compressed data from a disaggregated storage system, decrypt the data (if encrypted), and decompress the data. The decompression process can cause the data to expand, and such expansion can be significant (e.g., a typical ratio may be 1.5 or 2 times, but a ratio of 10 times or more is possible). This uncontrolled bandwidth expansion can cause problems at the client if the hardware (e.g., a dedicated hardware engine performing decompression and/or decryption) and/or software cannot handle the large and varying bandwidth of decompressed data.

One problem that can be caused at the client by uncontrolled bandwidth expansion is dropped network packets. For example, consider a scenario in which the client has stored compressed data at a storage server where the compression ratio is ten times. The client then retrieves the compressed data at the full rate of its network interface (e.g., 10 Gbps). At this rate, the client will be receiving the data at an effective decompressed rate of 100 Gbps (the compressed data will decompress to ten times its compressed size). The client may not be able to process the decompressed data at the 100 Gbps effective rate, which can overload the processing capability of the client (e.g., memory bus, processing unit capacity, hardware and/or software resources, etc.), and can result in dropped packets (e.g., due to the network interface buffer overflow), network packet retransmission, and overall slowdown of the network (e.g., due to the retransmission requests to the storage server).

Another problem that can be caused at the client by uncontrolled bandwidth expansion is latency jitter. For example, the storage units of compressed data being received by the client (e.g., at a full network data rate of 10 Gbps) may be compressed at different rates (e.g., a first storage unit may be compressed at 2 times while the next storage unit may be compressed at 8 times, and so on). As a result of dealing with the different compression rates, the client will take a different amount of time (and use a different amount of computing resources) to decompress each storage unit. Such differences in processing time and/or resources from one storage unit to the next cause jitter (e.g., the hardware and/or software requirements placed on the client will not be deterministic from one storage unit to the next), which can result in problems such as timeouts (e.g., a given storage unit takes longer than a timeout value causing a retransmission), intermittent network errors (e.g., network adapter congestion), or other processing errors.

One potential solution to the problem of uncontrolled bandwidth expansion is to design the client with additional hardware resources. However, such a solution may not be practical. For example, in order to deal with ten times expansion during decompression, a client with a 10 Gbps network adapter may need to be coupled with a 100 Gbps direct memory access (DMA) engine to ensure that the client can handle the bandwidth expansion. However, such a solution would not be able to handle an increases ratio of 20 times or 100 times expansion. Furthermore, the hardware resources needed to handle a large ratio may be prohibitively expensive or may not even be available.

In the technologies described herein, the issue of uncontrolled bandwidth expansion is addressed by transmitting compressed data along with padding so that the overall size of the transmitted data corresponds to the uncompressed size of the data. In some implementations, the storage server maintains the uncompressed size for each storage unit of compressed data (e.g., in a database or other storage repository). When the storage server receives a request for the compressed data, the storage server adds padding to the storage units of compressed data to match the uncompressed size and sends the storage units of compressed data and the padding to the client. The client then receives the storage units of compressed data and padding, discards the padding, and decompresses the compressed data. The bandwidth required by the decompressed data will be approximately equal to the network bandwidth with which the compressed data and padding were received. For example, if the client is receiving the compressed data and padding at a rate of 10 Gbps, then the decompressed data will have a corresponding bandwidth of approximately 10 Gbps (after discarding the padding and decompressing). In this way, the bandwidth of the decompressed data can be guaranteed to correspond to the bandwidth of the network interface. In other words, the bandwidth of the decompressed data will not be uncontrolled. Instead, it will be controlled by the network interface of the client. In some implementations, the bandwidth of the decompressed data can be further controlled using network packet rate control at the storage server, which can be less than the full rate of the network interface (but not greater than the full rate of the network interface). Furthermore, because bandwidth expansion is controlled using the technologies described herein, problems such as dropped packets and latency jitter can be reduced or eliminated.

In some implementations, a network protocol is provided that implements the technologies described herein by defining a compressed data header and data format for the network packet contents. For example, the network protocol can be implemented as a layer four (transport layer) protocol encapsulated in Internet protocol (IP) packets. The network protocol can also be implemented at other network layers, such as a layer five protocol that uses user datagram protocol (UDP) datagrams.

The technologies described herein can take advantage of network environments with sufficient available network bandwidth to handle transmitting compressed data but with padding to result in an overall uncompressed size. For example, in some environments excess network bandwidth is available (e.g., to handle peak demand) and/or is more easily scalable than client hardware. Therefore, the technologies described herein for controlled bandwidth expansion can be implemented without any changes to network capacity or client capability in some situations and/or with increased network capacity in others.

Environment for Performing Controlled Bandwidth Expansion

In any of the implementations described herein, controlled bandwidth expansion can be performed within an environment in which storage servers provide compressed data to clients. For example, the environment can be a data center environment (e.g., a data center at a single geographical location or a data center at multiple geographical locations connected via public and/or private network connections).

FIG. 1 is a diagram of an example environment 100 within which controlled bandwidth expansion is performed. The example environment 100 can be a data center comprising disaggregated data storage facilities and clients (e.g., server computers operating as individual clients, virtual instances running on server computers, and/or other types of software or hardware clients that utilize the disaggregated data storage facilities).

Depicted in the example environment 100 is a storage server 110 (one type of disaggregated data storage facility) associated with one or more storage devices 120 that store compressed data in storage units. The storage server 110 can comprise one or more computing devices that provide data storage functionality allowing clients, such as client 130, to read and write data (e.g., compressed and/or uncompressed data) via the network 150. The associated storage devices 120 can be hard disks, solid state drives (SSDs), and/or other data storage devices. The network 150 can comprise local network connections (e.g., within a data center location) and/or remote network connections (e.g., connections between data centers such as private network connections, connections via the Internet, etc.). The example environment 100 can support additional storage servers 110 and additional clients 130.

Depicted in the example environment 100 are various operations implementing the technology described herein for controlled bandwidth expansion. Specifically, in an example scenario the client 130 sends a read request for compressed data to the storage server 110 via the network 150, as depicted at 140. As depicted at 112, the storage server 110 receives the read request for the compressed data from the client 130. As depicted at 114, the storage server 110 obtains the requested compressed data from the storage devices 120. The compressed data is stored in the storage devices 120 in data storage units. The data storage units can be block storage units (physical blocks with a physical block size or logical blocks that are a multiple of a physical block size) or object storage units (having a fixed size or a variable size). For example, the requested compressed data may be a file with a file size of 20 KB that is stored as 40 individual 512 byte storage blocks in the storage devices 120.

As depicted at 116, the storage server 110 obtains compressed and uncompressed sizes for the storage units. For example, the storage server 110 can store the uncompressed sizes in a database separate from the compressed data (e.g., a separate database stored at the storage devices 120 or at another location). The uncompressed sizes can also be stored along with the compressed data. The compressed sizes may be determined directly from the storage units (e.g., by their block size) or the compressed sizes may be stored separately (e.g., in the database along with the uncompressed sizes).

The compressed size for a storage unit refers to the size of the compressed data stored within the storage unit, which may be equal to the size of the storage unit (e.g., a 512 byte storage unit with 512 bytes of compressed data) or may have a different size (e.g., a 512 byte storage unit that only contains 150 bytes of compressed data). The uncompressed size of a storage unit refers to the size of the compressed data stored within the storage unit when it has been decompressed (e.g., 512 bytes of compressed data stored within a 512 byte storage unit may have an uncompressed size of 900 bytes).

As depicted at 118, the storage server 110 generates network packet content for sending the compressed data to the client 130 with padding to approximately equal the uncompressed size (e.g., the compressed size plus the padding equals the uncompressed size). For example, for each storage unit the storage server 110 can generate network packet content comprising the storage unit (that has a compressed size) and padding associated with the storage unit (having a padding size equal to the uncompressed size of the storage unit minus the compressed size of the storage unit). For example, if a given storage unit has a compressed size of 512 bytes and an uncompressed size of 820 bytes, then the network packet content would comprise the 512 byte storage unit plus 308 bytes of padding for an overall size of 820 bytes (equal to the uncompressed size of the storage unit).

As depicted at 142, the storage server 110 sends the network packet content to the client 130 in one or more network packets that comprise the storage units containing the compressed data and the padding.

As depicted at 132, the client 130 receives the network packets, discards the padding, and decompresses the compressed data from the storage units.

Figure 2:
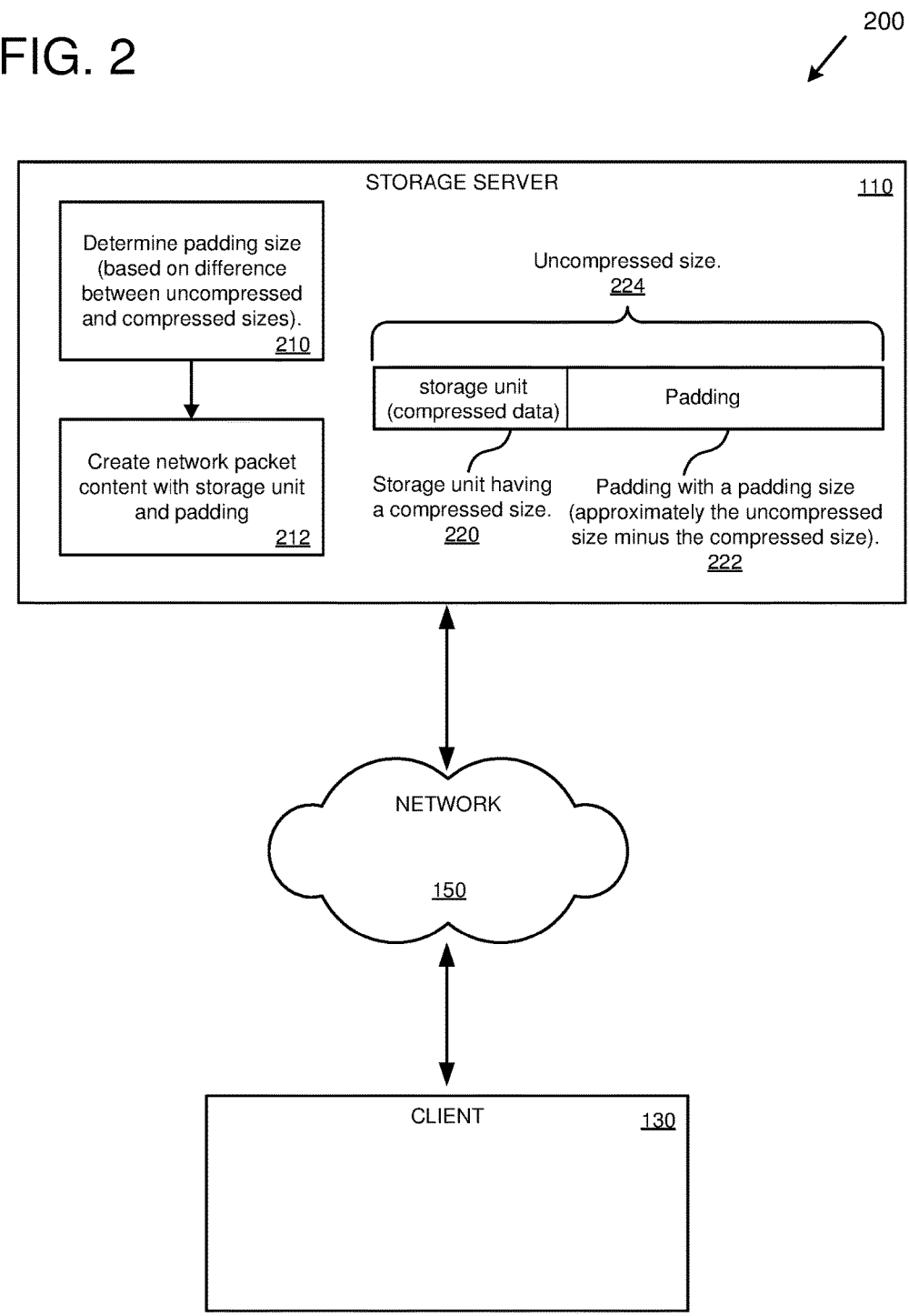
FIG. 2 is a diagram of an example environment supporting controlled bandwidth expansion, including determining padding sizes for storage units.

FIG. 2 is a diagram of an example environment 200 within which controlled bandwidth expansion is performed. The example environment 200 depicts additional operations that can be performed when generating the network packet content (e.g., when performing the operation depicted at 118 in FIG. 1).

As depicted at 210, the storage server 110 determines the padding size for a given storage unit. The padding size is approximately equal to the uncompressed size of the storage unit minus the compressed size of the storage unit. At 212, the storage server 110 creates network packet content comprising the storage unit (having the compressed size) and the padding. The network packet content is illustrated by the storage unit (depicted at 220) and the padding (depicted at 222) that together have a size approximately equal to the uncompressed size of the storage unit (depicted at 224).

Figure 3:
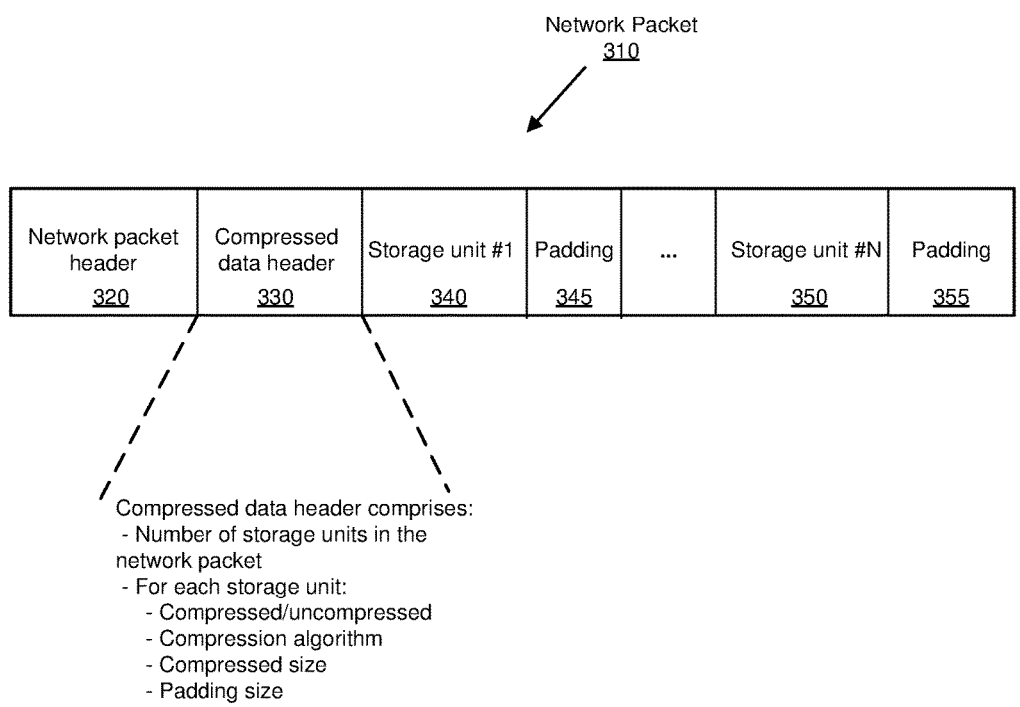
FIG. 3 is a diagram of an example network packet in which network packet content can be transmitted.

FIG. 3 is a diagram of an example network packet 310 in which network packet content can be transmitted. For example, the network packet 310 can be an IP packet with an IP network packet header 320. The network packet content is located in the payload area of the network packet 310. In the example network packet 310, a number of storage units containing compressed data are depicted, including storage unit #1 340 and associated padding 345 through storage unit #N and associated padding 355. The padding (e.g., 345 and 355) can be any data value (e.g., all ones, all zeroes, random data, or another data value or data pattern). For example, it can be beneficial to use bytes of random data for the padding because it may provide additional security (e.g., it may make it more difficult to determine what type of data is being transmitted in the network packets such as the type of compression being used, and it may make it more difficult to determine the format of the payload such as distinguishing between the storage unit and the padding). The number of storage units and associated padding that fit within the payload area of a given network packet depends on the payload size of the given network packet and the sizes of the storage units and associated padding.

In some implementations, the network packet content for each network packet comprises a header (called a compressed data header), such as compressed data header 330, which contains information describing the storage units contained within the network packet. For example, the compressed data header 330 can indicate the number of storage units contained within the network packet 310. The compressed data header 330 can also indicate information for each of the storage units contained within the network packet 310, including an indication of whether the storage unit is compressed or uncompressed (e.g., a compression flag), the compression algorithm used, the compressed size of the storage unit, and/or the padding size associated with the storage unit. In some implementations, some storage units may be compressed while others may be uncompressed. In addition, the compression algorithm may be different between storage units. The following is a simplified example of storage unit information that can be contained within a compressed data header. The simplified example is for two storage units that are compressed with a particular compression algorithm (e.g., Lempel-Ziv or another compression algorithm).

---

Number of storage units in network packet: 2
Storage unit 1:
   Compression flag: true
   Compression algorithm: (algorithm identifier)
   Compressed size: 512 bytes
   Padding size: 220 bytes
Storage unit 2:
   Compression flag: true
   Compression algorithm: (algorithm identifier)
   Compressed size: 512 bytes
   Padding size: 90 bytes

---

The format of the network packet content depicted in FIG. 3, including the compressed data header 330 and storage units and padding, can be implemented as a network protocol (e.g., a controlled bandwidth expansion protocol). For example, the network protocol can define information sent in the compressed data header 330 along with details of how the storage units and padding are included within the network packet content and encapsulated in the network packets (e.g., within IP packets) for transmitting via the network.

The example network packet 310 represents one example arrangement in which the storage units and associated padding (as contiguous data) are incorporated into the network packet. However, other arrangements can be used as well. For example, the padding can be placed before (instead of following) its associated storage unit (e.g., padding 345 can be placed before storage unit #1 340). The padding can be split within a network packet (e.g., with a first portion of the padding before a storage unit a second portion of the padding following the storage unit). A storage unit can also be arranged in network packets in a variety of ways. For example, a storage unit can be split into a plurality of storage unit portions for sending in one network packet or split among a plurality of network packets.

Methods for Performing Controlled Bandwidth Expansion

In any of the technologies described herein, methods can be provided for performing controlled bandwidth expansion.

For example, a storage server can receive a request for compressed data, obtain the compressed data stored in storage units that have compressed sizes and uncompressed sizes, generate network packet content comprising the storage units and padding, and send the network packet content to a client in network packets. The client can receive the network packets, discard the padding, and decompress the compressed data.

Figure 4:
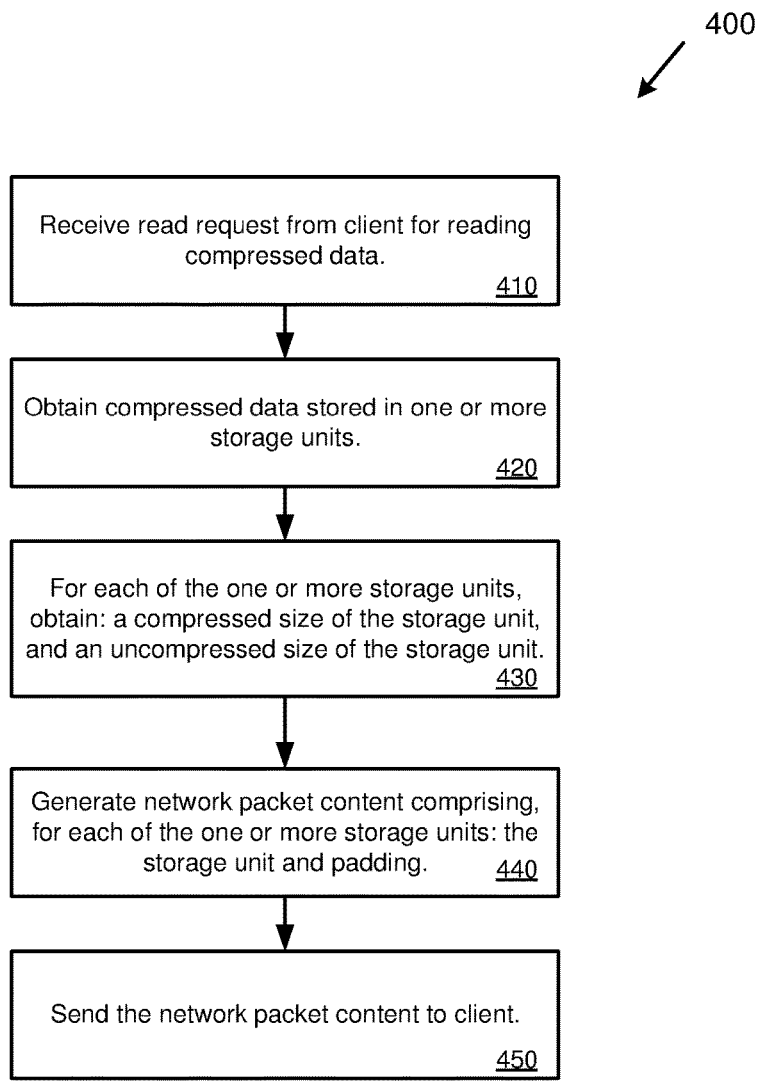
FIGS. 4, 5, and 6 are flowcharts of example methods for performing controlled bandwidth expansion.

FIG. 4 is a flow chart of an example method 400 for performing controlled bandwidth expansion when providing compressed data to clients. For example, the method 400 can be performed by a storage server (e.g., by storage server 110).

At 410, a read request is received for reading compressed data. The read request is received from a client (e.g., from a client computing device, from a virtual instance client, etc.). For example, the read request can comprise a unique identifier for the compressed data (e.g., a unique file name).

At 420, the requested compressed data is obtained. The compressed data is stored in one or more storage units (e.g., block storage units or object storage units). The compressed data can be obtained from local storage devices (e.g., hard disks, SSDs, etc.) and/or remote storage devices.

At 430, a compressed size and an uncompressed size is obtained for each of the one or more storage units that contain the compressed data. For example, the uncompressed sizes can be obtained from a data store (e.g., a database) that maintains a list of storage units and their associated uncompressed sizes. The compressed sizes can be obtained from the data store or from another location (e.g., directly from the sizes of the storage units themselves).

At 440, network packet content is generated. The network packet content comprises, for each of the one or more storage units, the storage unit and padding associated with the storage unit. The padding associated with a given storage unit has a padding size approximately equal to the uncompressed size of the given storage unit minus the compressed size of the given storage unit. Therefore, the total size of the storage unit plus its associated padding is approximately equal to the uncompressed size of the storage unit. In some implementations, the network packet content further comprises a compressed data header (e.g., one header for each network packet that indicates which storage units are contained in the network packet).

At 450, the network packet content is sent to the client in one or more network packets.

Figure 5:
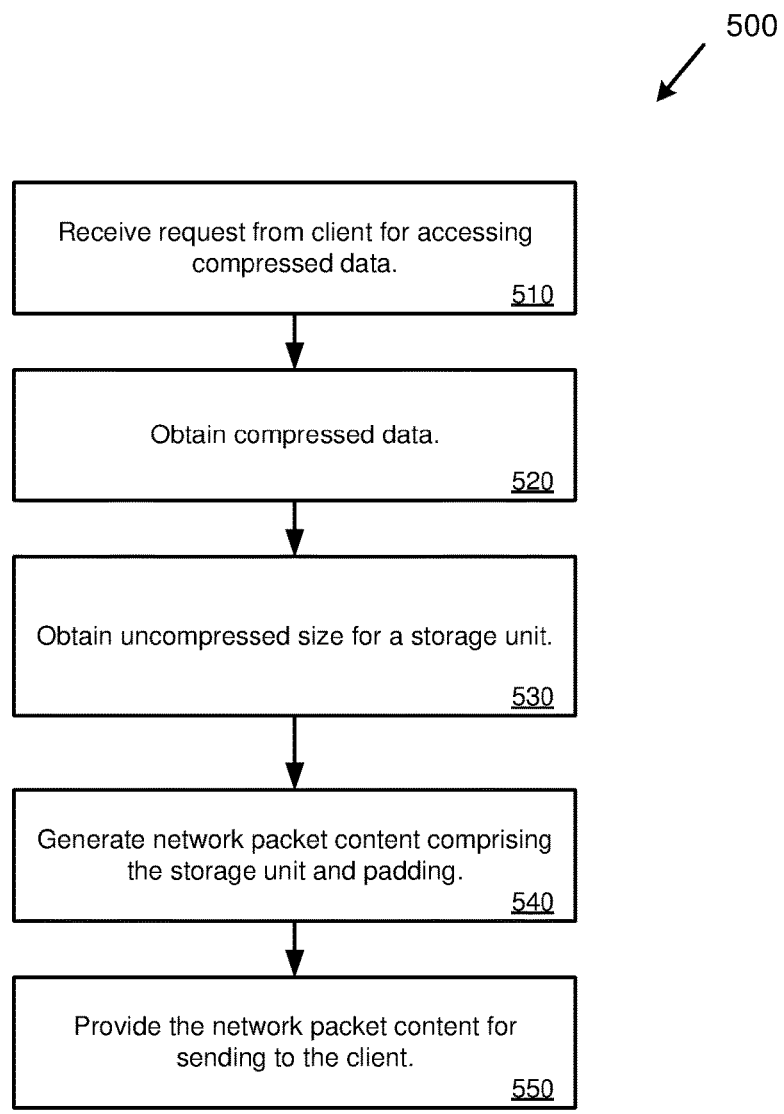

FIG. 5 is a flow chart of an example method 500 for performing controlled bandwidth expansion when providing compressed data to clients. For example, the method 500 can be performed by a storage server (e.g., by storage server 110).

At 510, a request is received for accessing compressed data. The request is received from a client (e.g., from a client computing device, from a virtual instance client, etc.). The request can be a read request for reading compressed data. The request can comprise a unique identifier for the compressed data (e.g., a unique file name).

At 520, the requested compressed data is obtained. The compressed data can be stored in one or more storage units (e.g., block storage units or object storage units). The compressed data can be obtained from local storage devices (e.g., hard disks, SSDs, etc.) and/or remote storage devices. The compressed data can be other types of data as well, such as web page data or streaming media data.

At 530, an uncompressed size is obtained for a storage unit containing at least a portion of the requested compressed data. The uncompressed size can be obtained from a data store (e.g., a database) that maintains a list of storage units and their associated uncompressed sizes.

At 540, network packet content is generated comprising the storage unit (that has a compressed size indicating the size of the compressed data stored within the storage unit) and padding. The padding has a padding size based on the difference between the compressed size and the uncompressed size for the storage unit. In some implementations, the padding size is equal to, or approximately equal to, the uncompressed size of the storage unit minus the compressed size of the storage unit. In some implementations, the padding size is substantially equal to the uncompressed size of the storage unit minus the compressed size of the storage unit.

At 550, the network packet content is provided for sending to the client in one or more network packets.

The padding can be arranged in network packets in a variety of ways. For example, the padding can be included in a network packet as contiguous padding data (e.g., either before or following a storage unit). The padding can be split within a network packet (e.g., with a first portion of the padding before a storage unit a second portion of the padding following the storage unit). A storage unit can also be arranged in network packets in a variety of ways. For example, a storage unit can be split into a plurality of storage unit portions for sending in one network packet or split among a plurality of network packets.

In some implementations, padding is sent in one or more dummy packets. For example, a first group of one or more network packets can be provided for sending one or more storage units containing the compressed data. A second group of one or more network packets can be provided for sending the padding. The second group of packets can be discarded at the client as they do not contain any of the storage units.

In some implementations, the storage server receives a network bandwidth indication from the client. For example, a client with a 10 Gbps network interface may specify a lower bandwidth (e.g., an indication of 5 Gbps bandwidth when establishing a network connection to the storage server for retrieving compressed data). In such a situation, the storage server can send network packets at a rate corresponding to the network bandwidth indication received from the client (e.g., at a rate of 5 Gbps rather than a full client network rate of 10 Gbps). For example, a 5 Gbps rate indicates that the compressed data should be delivered to the client such that the effective bandwidth (storage units containing compressed data plus padding) equals 5 Gbps.

Figure 6:
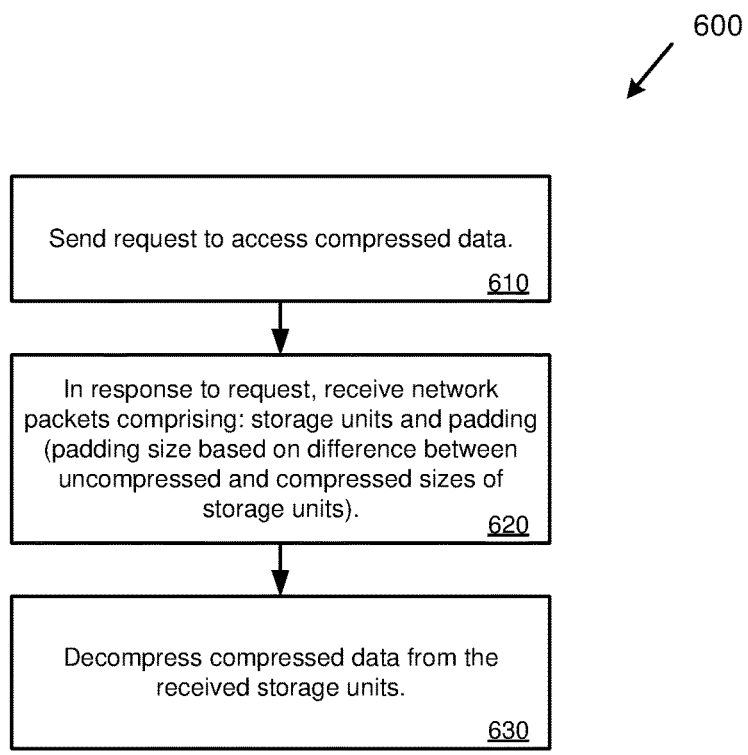

FIG. 6 is a flow chart of an example method 600 for performing controlled bandwidth expansion when receiving compressed data from a remote computing device. For example, the method 600 can be performed by a client (e.g., by client 130) when requesting and receiving compressed data from a storage server (e.g., from storage server 110).

At 610, a request is sent to a remote computing device to access compressed data. The request can be a read request or a write request (e.g., a write request that directs the remote computing device to "write back" the compressed data to the client). For example, the request can comprise a unique identifier for the compressed data (e.g., a unique file name).

At 620, network packets are received in response to the request. The network packets comprise storage units containing the compressed data and padding. The padding has a padding size based on the difference between the uncompressed and uncompressed sizes of the storage units. In some implementations, each storage unit is associated with padding that has a padding size approximately equal to the uncompressed size of the storage unit minus the compressed size of the storage unit.

At 630, the compressed data is decompressed from the received storage units.

Example Service Provider Environments

Figure 7:
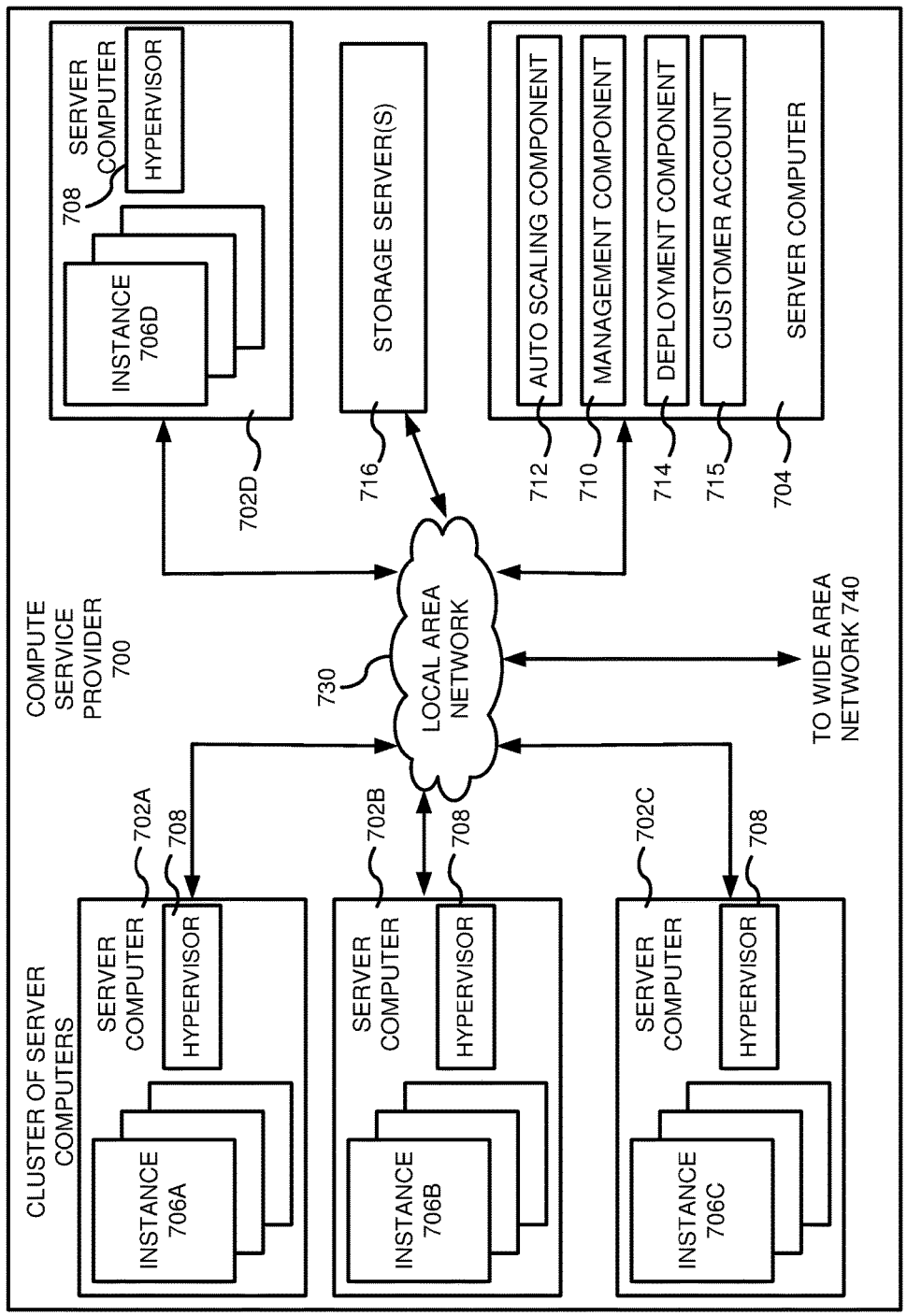
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, the server computers 702A-702D have a separate management network interface and associated management controller. The management network interfaces of the server computers 702A-702D connect to a separate management network (e.g., the local area network 730 can comprise at least two networks, a management network that carries management traffic and a general data network for all other traffic). The management controllers of the server computers 702A-702D can perform network broadcast traffic filtering by enabling broadcast filtering during a first time period and disabling broadcast filtering during a second time period and apply the first and second time periods as a repeating pattern (e.g., as an on-off pattern).

In some implementations, one or more storage servers 716 are present. The storage servers 716 store compressed data for clients of the environment, which can include the server computers 702A-702D and the instances 706A-706D. For example, the storage servers 716 can receive read requests from the clients to read compressed data, obtain uncompressed sizes of storage units, generate network packet content comprising the storage units (with compressed sizes) and padding (with padding sizes equal to the uncompressed sizes minus the compressed sizes), and send the network packet content to the clients in network packets via the local area network 730 and/or the wide area network 740.

Figure 8:
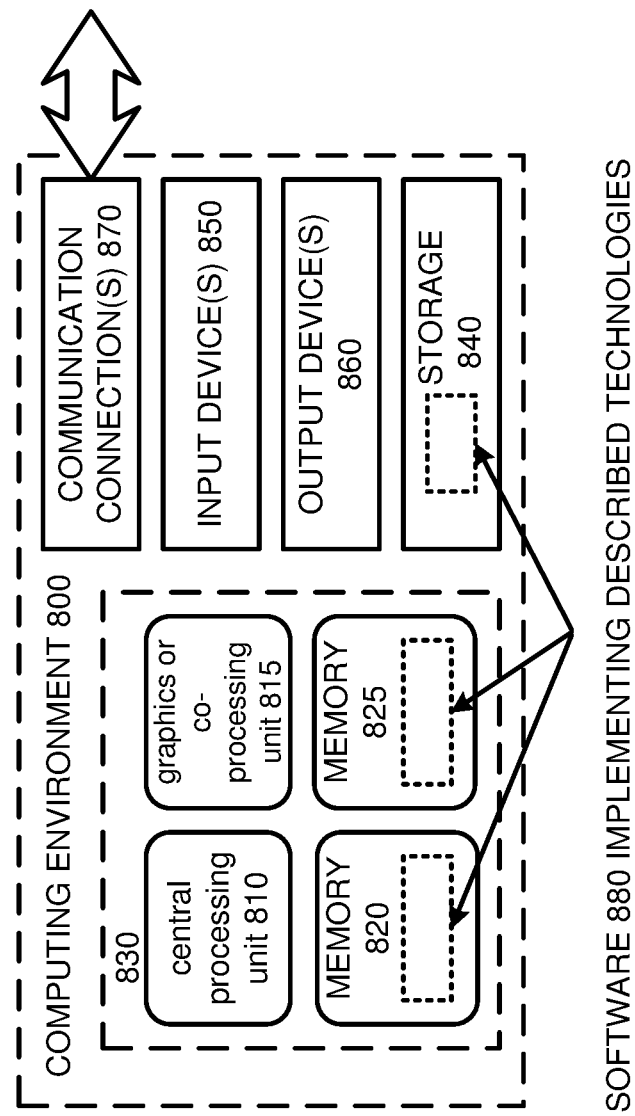
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method comprising:
   receiving, from a client, a read request for reading compressed data;
   obtaining the compressed data from a storage device, wherein the compressed data is stored in multiple storage units, wherein the storage units are block storage units or object storage units;
   obtaining, for each of the storage units of the compressed data:
      a compressed size for the storage unit; and
      an uncompressed size for the storage unit;
   generating network packet content for network packets, the network packet content comprising, for each of the storage units of the compressed data:
      the storage unit having the compressed size; and
      padding for the storage unit, the padding having a padding size equal to a difference between the compressed and uncompressed sizes of the storage unit; and
   providing the network packet content for sending in network packets to the client, wherein the network packet content is stored in payload areas of the network packets.

2. The method of claim 1 wherein the network packet content further comprises, for each of the network packets:
   a compressed data header indicating:
      a number of the storage units contained in the network packet; and
      for each of the storage units contained in the network packet, the compressed size for the storage unit and the padding size for the storage unit.

3. The method of claim 2 wherein the compressed data header also indicates:
   for each of the storage units contained in the network packet, a compression algorithm used to compress the storage unit; and
   for each of the storage units contained in the network packet, an indication of whether the storage unit is compressed.

4. The method of claim 1 wherein one of the network packets contains multiple storage units.

5. The method of claim 1 wherein the client receives the network packets, discards the padding, and decompresses the compressed data from the storage units.

6. A system comprising:
   a hardware logic component;
   wherein the hardware logic component is configured to perform operations comprising:
      receiving a request for accessing compressed data;
      obtaining the compressed data;
      obtaining an uncompressed size for a storage unit storing at least a portion of the compressed data:
      generating network packet content for a network packet, the network packet content comprising:
         the storage unit having a compressed size; and
         padding for the storage unit, the padding having a padding size based on a difference between the compressed and uncompressed sizes for the storage unit; and
      providing the network packet content for sending to a client in a payload area of the network packet.

7. The system of claim 6 further comprising:
   a storage device;
   wherein the compressed data is obtained from the storage device, and wherein the storage unit is a block storage unit or an object storage unit; and
   wherein the request is a read request.

8. The system of claim 6 wherein the padding is arranged in the network packet before the storage unit, following the storage unit, or partially before and partially following the storage unit.

9. The system of claim 6 wherein the storage unit is split into a plurality of storage unit portions for sending in a plurality of network packets.

10. The system of claim 6 wherein providing the network packet content for sending to the client comprises:
    providing the storage unit for sending to the client in a first network packet; and
    providing the padding for sending to the client in a second network packet.

11. The system of claim 6 wherein the compressed data is stored in multiple storage units, wherein the network packet content further comprises:
    a compressed data header indicating:
       a number of storage units contained in the network packet; and
       for each of the storage units contained in a network packet, a compressed size for the storage unit and the padding size for the storage unit.

12. The system of claim 11 wherein the compressed data header also indicates:
    for each of the storage units contained in the network packet, a compression algorithm used to compress the storage unit; and for each of the storage units contained in the network packet, an indication of whether the storage unit is compressed.

13. The system of claim 6, wherein the compressed data is stored in a plurality of storage units each having a respective compressed size, wherein the network packet content comprises, for each of the storage units:
the storage unit having the compressed size; and
padding for the storage unit, the padding having a padding size based on a difference between the uncompressed and compressed sizes for the storage unit; and
wherein the network packet content for sending to the client is provided in a plurality of network packets.

14. The system of claim 6, the operations further comprising:
maintaining a data store for the compressed data comprising, for each storage unit of the compressed data:
an uncompressed size for the storage unit; and
a compression algorithm.

15. The system of claim 6 wherein the hardware logic component is a system-on-a-chip.

16. A computer-readable storage medium storing computer-executable instructions for causing a system to perform operations, the operations comprising:
receiving a request for accessing compressed data;
obtaining the compressed data;
obtaining an uncompressed size for a storage unit storing at least a portion of the compressed data:
generating network packet content for a network packet, the network packet content comprising:
the storage unit having a compressed size; and
padding for the storage unit, the padding having a padding size based on a difference between the compressed and uncompressed sizes for the storage unit; and
providing the network packet content for sending to a client in a payload area of the network packet.

17. The computer-readable storage medium of claim 16 wherein the compressed data is obtained from a storage device, and wherein the storage unit is a block storage unit or an object storage unit; and
wherein the request is a read request.

18. The computer-readable storage medium of claim 16 wherein the padding is arranged in the network packet before the storage unit, following the storage unit, or partially before and partially following the storage unit.

19. The computer-readable storage medium of claim 16 wherein the storage unit is split into a plurality of storage unit portions for sending in a plurality of network packets.

20. The computer-readable storage medium of claim 16 wherein providing the network packet content for sending to the client comprises:
providing the storage unit for sending to the client in a first network packet; and
providing the padding for sending to the client in a second network packet.

* * * * *